May 3, 1932. T. MADSEN 1,856,961
RESTRICTING MEANS FOR COMPOSITE PISTON PACKING RINGS
Filed July 7, 1931
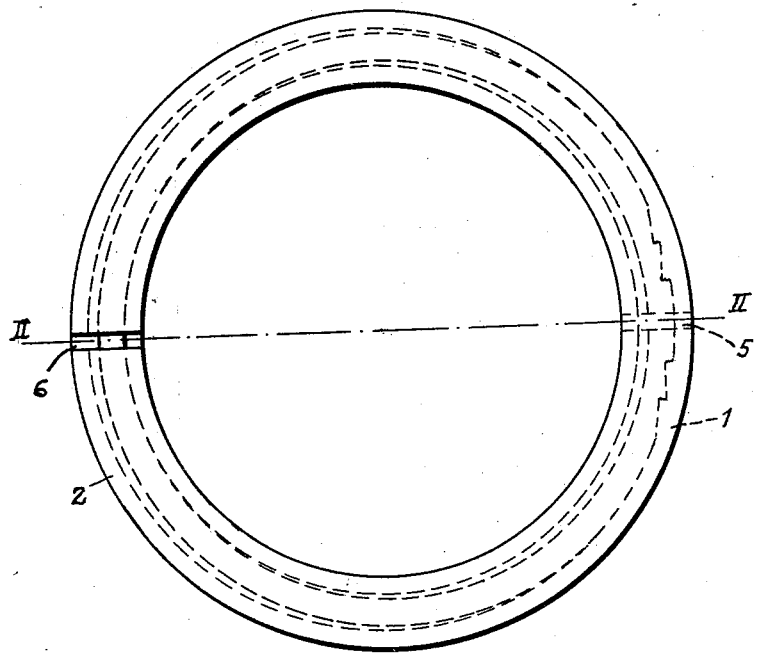
Fig. 1.
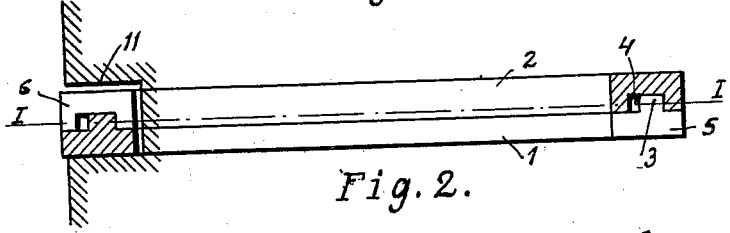
Fig. 2.
Fig. 3.
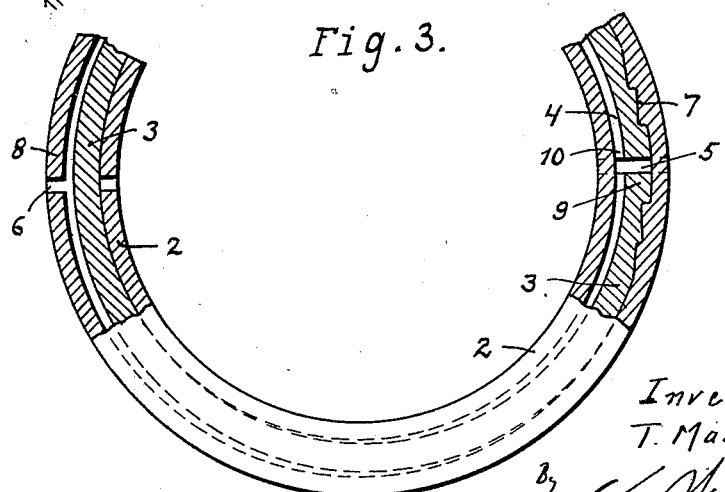
Inventor:
T. Madsen,
Atty Patented May 3, 1932

1,856,961

UNITED STATES PATENT OFFICE

TAGE MADSEN, OF GOTTENBORG, SWEDEN

RESTRICTING MEANS FOR COMPOSITE PISTON PACKING RINGS

Application filed July 7, 1931, Serial No. 549,227, and in Great Britain July 14, 1930.

This invention relates to piston packing rings with restricted outward movement, particularly such packings as comprise two complete slit rings with interengaging annular projections and recesses and the object of my improvement is to prevent excessive wear to the cylinder lining in steam or combustion engines caused by the packing.

In piston packings consisting of a single slit ring it is of course well known to provide means for restricting outward movement of the ring; such means usually comprise locking members on the ends of the ring co-acting either with each other or with corresponding locking members in the body of the piston. Restricting means have also previously been used in composite packings, as in the arrangement shown in British patent specification No. 13,718/1904. This arrangement comprises two complete slit rings which interengage by means of axially disposed annular projections and recesses and the restricting means therein consists of radial stops on one of the rings engaging gaps in the other ring. Such packings, however, cannot be inserted in the turned grooves of a common cast iron piston, because there is no space in the piston groove for axially moving the two rings apart when they have to be replaced.

Composite packings of this kind can be made to suit common pistons by making the groove in one ring wider than the projection on the other ring so that the restricting means can be engaged or disengaged by simply moving the ends of one ring radially inwards within the space provided in the other ring.

The accompanying drawings illustrate the composite restricted packing according to the present invention. Fig. 1 shows the packing in plan view, Fig. 2 same in axial section on line II—II in Fig. 1, and Fig. 3 shows a plan view of the same packing partly in section to better show the restricting means.

The packing is composed of two rings 1 and 2, the ring 1 being provided with an annular projection 3 resting in a groove 4 in the ring 2. Ring 1 is slit at 5 and ring 2 at 6 and both rings tend to spring outwards when inserted in the piston and in the cylinder proper. Such rings are known from United States patent specification No. 1,725,660, in which the groove is wider than the projection. According to the present invention restricting means 7 (Fig. 1) are provided on the annular projection 3 and in the groove, preferably only on the two ends 9 of the ring 1 which has the projection 3 and on the middle part of the ring 2 which has the groove 4. The drawings show the packing in the state it assumes when inserted in its groove 11 in the piston. The two rings have a tendency to spring outwards, the ends 8 of the ring 2 but are withheld by the projections 3 on the ring 1 and the ends 9 of ring 1 are kept in place by the restricting means 7 which consist of corrugations, hooks or other kinds of stops. To release the rings from each other only ring 1 needs a radial pressure inwards on the ends 9 to disengage the restricting means 7, for which purpose sufficient space 10 must be available in the groove 4 behind the projection 3.

The composite packing as described can be inserted in the grooves of a common cast iron piston such as indicated at 11 on the left hand side of Fig. 2 because there is no necessity to move the parts axially to release them from each other. When removing the rings only a small radial pressure is applied on the ends of ring 1 and on the ends of ring 2 in order to release the restricting means. The packing is then taken out in the same manner as a common composite packing. No restricting means are necessary to provide on the diametrically opposite side of the packing on the ends 8.

I claim:—

1. In a packing ring composed of two complete slit rings with interengaging annular projections and recesses the recesses being wider than the projection and restricting hooks provided at the ends of one of the rings, the radial depth of said hooks being smaller than the maximum radial space in the recess behind the projection.

2. In a packing ring composed of two complete slit rings with interengaging annular projections and recesses the recesses being wider than the projection and restricting hooks at each end of one of the rings to coact with hooks in the other ring, the radial depth of said hooks being smaller than the maximum radial space in the recess behind the projection.

In testimony whereof I have signed my name to this specification.

TAGE MADSEN.